United States Patent
Zhu et al.

(10) Patent No.: US 11,025,704 B2
(45) Date of Patent: Jun. 1, 2021

(54) METHODS AND SYSTEMS FOR ENHANCED COMPONENT RELATIONSHIPS IN REPRESENTATIONS OF DISTRIBUTED COMPUTING SYSTEMS

(71) Applicant: INTERNATIONAL BUSINESS MACHINES CORPORATION, Armonk, NY (US)

(72) Inventors: Jun Zhu, Durham, NC (US); Shikhar Kwatra, Durham, NC (US); Yu Cao, Cary, NC (US); Jorge Luis Padilla, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/505,321

(22) Filed: Jul. 8, 2019

(65) Prior Publication Data

US 2021/0014300 A1   Jan. 14, 2021

(51) Int. Cl.
*H04L 29/08* (2006.01)
*G06F 16/28* (2019.01)
*H04L 12/26* (2006.01)

(52) U.S. Cl.
CPC ............ *H04L 67/10* (2013.01); *G06F 16/288* (2019.01); *H04L 43/08* (2013.01); *H04L 67/12* (2013.01); *H04L 67/22* (2013.01)

(58) Field of Classification Search
CPC ......... H04L 67/10; H04L 43/08; H04L 67/12; H04L 67/22; G06F 16/288

USPC ........................................................ 709/224
See application file for complete search history.

(56) References Cited

U.S. PATENT DOCUMENTS

| | | | |
|---|---|---|---|
| 7,539,147 B2 | 5/2009 | Chang et al. | |
| 7,565,627 B2 | 7/2009 | Brill et al. | |
| 7,930,678 B2 | 4/2011 | Tian et al. | |
| 8,055,675 B2 | 11/2011 | Higgins et al. | |
| 9,632,858 B2 | 4/2017 | Sasturkar et al. | |
| 2006/0004872 A1 | 1/2006 | Tian et al. | |
| 2006/0098579 A1 | 5/2006 | Chang et al. | |
| 2007/0050343 A1 | 3/2007 | Siddaramappa et al. | |
| 2008/0155305 A1 | 6/2008 | Hind et al. | |
| 2009/0116404 A1 | 5/2009 | Mahop et al. | |
| 2010/0241644 A1 | 9/2010 | Jackson et al. | |
| 2013/0046798 A1 | 2/2013 | Mankovskii et al. | |
| 2015/0033086 A1 | 1/2015 | Sasturkar et al. | |
| 2016/0034334 A1* | 2/2016 | Sadovsky | G06F 11/324 714/57 |

(Continued)

*Primary Examiner* — Nicholas R Taylor
*Assistant Examiner* — Chong G Kim
(74) *Attorney, Agent, or Firm* — Griffiths & Seaton PLLC

(57) ABSTRACT

Embodiments for representing the operational state of a distributed computing system are provided. Relationships within a distributed computing system are identified. Each of the identified relationships is associated with communication between two of a plurality of computing nodes within the distributed computing system. At least one difference between a healthy state of the distributed computing system and an impaired state of the distributed computing system is determined based on the identifying of the relationships. A representation of the determined at least one difference between the healthy state and the impaired state of the distributed computing system is generated based on information associated with a user.

18 Claims, 10 Drawing Sheets

(56) References Cited

U.S. PATENT DOCUMENTS

2019/0068627 A1\* 2/2019 Thampy ................ H04W 12/12
2019/0114247 A1\* 4/2019 Chen ................... G06F 11/3409

\* cited by examiner

METHODS AND SYSTEMS FOR ENHANCED COMPONENT RELATIONSHIPS IN REPRESENTATIONS OF DISTRIBUTED COMPUTING SYSTEMS

BACKGROUND OF THE INVENTION

Field of the Invention

The present invention relates in general to computing systems, and more particularly, to various embodiments for providing representations of distributed computing systems with enhanced component relationships.

Description of the Related Art

Generally, distributing computing (or distributed computing systems) refers to computing systems that include multiple components (e.g., microservices, containers, etc.) that are implemented on different networked computing devices that coordinate their actions by sending various types of communications (e.g., requests, data, etc.) to one another. Often, this activity is performed in order to achieve a common goal (i.e., the components are working together to jointly perform a functionality). For example, the components may be jointly running a distributed program. The implementation of such systems is becoming increasingly common as organizations (e.g., companies, service providers, etc.) are breaking away from monolithic applications and moving towards utilizing multiple microservices and packaged containers.

Users (e.g., administrators, site reliability engineers (SREs), etc.) of such systems may be provided with visual representations (e.g., knowledge graphs, ontology graphs, etc.) that show the various nodes within the system, as well as relationships between the nodes (e.g., which nodes communicate with each other), which may be helpful in investigating and/or correcting problems that arise within the systems. However, given the number of entities or nodes involved in relatively large systems (e.g., perhaps in the thousands), it is often challenging (and/or time consuming) for the user to identify which nodes and/or relationships that are the cause of and/or critical for resolving the problems.

SUMMARY OF THE INVENTION

Various embodiments for representing the operational state of a distributed computing system by one or more processors are described. Relationships within a distributed computing system are identified. Each of the identified relationships is associated with communication between two of a plurality of computing nodes within the distributed computing system. At least one difference between a healthy state of the distributed computing system and an impaired state of the distributed computing system is determined based on the identifying of the relationships. A representation of the determined at least one difference between the healthy state and the impaired state of the distributed computing system is generated based on information associated with a user.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
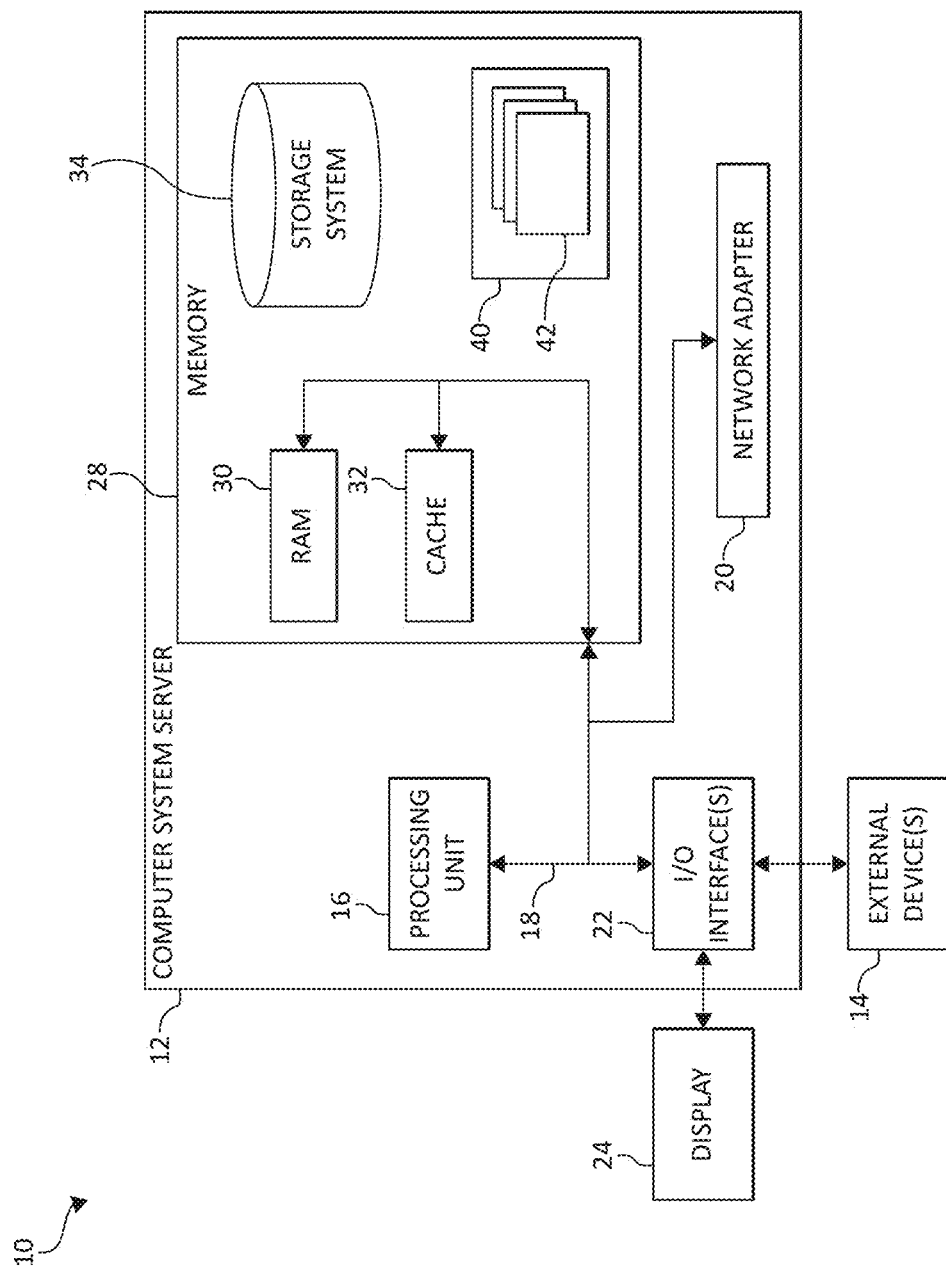
FIG. 1 is a block diagram depicting an exemplary computing node according to an embodiment of the present invention.

As discussed above, distributing computing or distributed computing systems generally involve computing systems that include multiple components (e.g., microservices, containers, etc.) that are implemented on different networked computing devices that coordinate their actions by sending various types of communications (e.g., requests, data, etc.) to one another. Often, this activity is performed in order to achieve a common goal (i.e., the components are working together to jointly perform a functionality). For example, the components may be jointly running a distributed program. The implementation of such systems is becoming increasingly common as organizations (e.g., companies, service providers, etc.) are breaking away from monolithic applications and moving towards utilizing multiple microservices and packaged containers.

Users (e.g., administrators, site reliability engineers (SREs), etc.) of such systems may be provided with visual representations (e.g., knowledge graphs, ontology graphs, etc.) that show the various nodes within the system, as well as relationships between the nodes (e.g., which nodes communicate with each other), which may be helpful in investigating and/or correcting problems that arise within the systems. However, given the number of entities or nodes involved in relatively large systems, it is often challenging (and/or time consuming) for the user to identify which nodes and/or relationships that are the cause of and/or critical for resolving the problems.

For example, a multi-cloud container-orchestration system may include thousands of components (or nodes), each of which may be connected to (or in communication with) hundreds of others. Such systems may allow for the components to be easily deployed and managed. However, when a problem arises, such as a failed point of delivery ("POD" or "pod"), it may be very difficult and time consuming for the appropriate personnel to identify which relationships and/or nodes are the cause of the problem, even when provided with a basic representation of the components and relationships within the system. More specifically, it may be difficult for individuals, such as SREs, to understand and/or prioritize the various relationships between the components, identify the cause of the problem, and quickly remedy the situation. Simply put, it may take a very long time for the personnel to look through the individual relationships and test the various scenarios.

To address these needs, some embodiments described herein provide methods and systems for representing (or generating a representation of, mapping, etc.) the operational state of a distributed computing system (or distributed system), or more particularly, the components and the relationships between the components within such systems, based on, for example, personalized, adaptive heuristics (e.g., of the user) and/or an iterative learning mechanism. In some embodiments, the relationships are ranked based on information associated with the user and dynamically and/or selectively provided (or rendered) to the user based on such information in order to, for example, aid in correcting problems within the system (e.g., by prioritizing components and/or relationships that should be investigated).

The methods and systems described herein may be utilized with respect to, for example, any distributed systems or applications that utilize multiple microservices, containers, nodes, etc., such as Kubernetes, and Cloud Foundry.

In some embodiments, relationships between the components (or nodes) in the distributed system are identified to, for example, establish a base knowledge or healthy operational state (or simply "healthy state") of the system. The relationships may include explicit and implicit relationships. Explicit relationships may be identified by, for example, examining object attributes, such as the owner and namespace. Implicit relationships may be inferred based on, for example, network traffic, creation timestamp, events, pod states, etc.

In some embodiments, a cognitive analysis or artificial intelligence (AI) (e.g., ensemble machine learning mechanism) is utilized to prioritize or "weight" the relationships (and/or nodes) based on, for example, differences between the healthy state of the system and an impaired (or unhealthy state) of the system, information about the user (e.g., the user's role, previous interactions with the system, etc.), timestamp correlation, troubleshooting results and effectiveness, and previous interactions of other users with the system.

When the representation is generated (and/or rendered, provided to the user, etc. via a user interface or user interface module), the relationships may be displayed in such a way as to indicate which of the relationships are more "important" (e.g., at least with respect to the particular user) for resolving the problem(s) associated with the unhealthy state of the system. That is, in some embodiments, the relationships that are most relevant to the problem that the user is attempting to solve are, for example, highlighted and/or emphasized in the representation. Such may be valuable to help the user prioritize and quickly identify the component(s) and/or relationship(s) that are related to the issue.

In some embodiments, after a representation is provided to the user, various forms of feedback may be utilized by the system to alter the representation. For example, the system may determine a satisfaction rating for the user as they are viewing and/or interacting with the representation and alter the representation based on the satisfaction rating, as described below.

In some embodiments, AI-based systems and methods are provided which dynamically determine and augment the relationships (e.g., the representations thereof) in any distributed systems and selectively display the related entities to the user in an individualized adaptive format (e.g., an ontology or knowledge graph). The representations (e.g., indicators or "edges") of the relationships may be generated or rendered based on the ranking/importance of such relationships (e.g., at least with respect to the user).

While traditional relationship mapping may provide for establishing simple relationships between entities, they may not completely describe complex relationships. As such, in some embodiments, the relationships represented may not be simply based on one-dimensional logic, but rather on various layers of interdependencies and individualized preferences learned over time (or temporal duration).

With traditional relationship mapping of distributed systems, users may implement different approaches based on their personal expertise and knowledge to solve the issue at hand. In some embodiments described herein, the systems/methods provide users a comprehensive picture (or representation) of all the connections while allowing them to quickly discover the culprit of the problem by, for example, highlighting the stronger connections to the problem (i.e., rendering some of the relationship indicators differently than others).

As described above, in some embodiments, a cognitive analysis or machine learning technique may be utilized to perform at least some aspects of functionality described herein. For example, a cognitive analysis may be utilized to generate an initial representation of an impaired state of the distributed system based on information associated with the user, and/or after an initial representation is provided to the user, a cognitive analysis may be utilized to alter the representation based on the user's reaction (e.g., a determined satisfaction ranking) to the representation.

In some embodiments, the cognitive analysis includes generating a cognitive profile for the user(s) based on, for example, data sources associated with the user(s). Data sources that be use used to generate a cognitive profile for the user(s) may include any appropriate data sources associated with the user that are accessible by the system (perhaps with the permission or authorization of the user). Examples of such data sources include, but are not limited to, computing systems/devices/nodes associated with the user, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

The cognitive analysis may also include classifying natural language, analyzing tone, and analyzing sentiment (e.g., scanning for keywords, key phrases, etc.) with respect to, for example, communications sent to and/or from users. In some embodiments, natural language processing (NLP), Mel-frequency cepstral coefficients (MFCCs), and/or region-based convolutional neural network (R-CNN) pixel mapping (e.g., for images/videos sent to chatbots), as are commonly understood, are used.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, generating representations of distributed computing systems as described herein. Utilizing the models, the performance (or operation) of the system (e.g., utilizing/based on new inputs) may be predicted and/or the performance of the system may be optimized by investigating how changes in the input(s) effect the output(s). In some embodiments, feedback from users may be received (or detected) and utilized, allowing for the performance of the system to improve with continued use.

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices that are owned and/or otherwise associated with individuals (or users), and/or various applications that are utilized by the individuals on such computing devices.

In particular, in some embodiments, a method for representing the operational state of a distributed computing system by one or more processors is described. Relationships within a distributed computing system are identified. Each of the identified relationships is associated with communication between two of a plurality of computing nodes within the distributed computing system. At least one difference between a healthy state of the distributed computing system and an impaired state of the distributed computing system is determined based on the identifying of the relationships. A representation of the determined at least one difference between the healthy state and the impaired state of the distributed computing system is generated based on information associated with a user.

The information associated with the user may include at least one of a history of the user and subjects associated with the user. The plurality of computing nodes may include at least one of Kubernetes nodes, docker nodes, and virtual machines.

The representation of the determined differences between the healthy state and the impaired state of the distributed computing system may include a plurality of symbols and a plurality of relationship indicators. Each of the plurality of symbols may be associated with a respective one of the plurality of computing nodes, and each of the plurality of relationship indicators may be associated with a respective one of the identified relationships. The plurality of relationship indicators may includes first relationship indicators and second relationship indicators. The second relationship indicators may be different than the first relationship indicators and associated with the impaired state of the distributed computing system.

At least some of second relationship indicators may be different than others of the second relationship indicators based on the information associated with the user.

The representation of the determined at least one difference between the healthy state and the impaired state of the distributed computing system may be provided to the user. Information associated with monitoring the user while the representation is provided to the user may be received. The representation may be altered based on the information associated with the monitoring of the user. The monitoring of the user while the representation is provided to the user may be performed utilizing a sensor.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
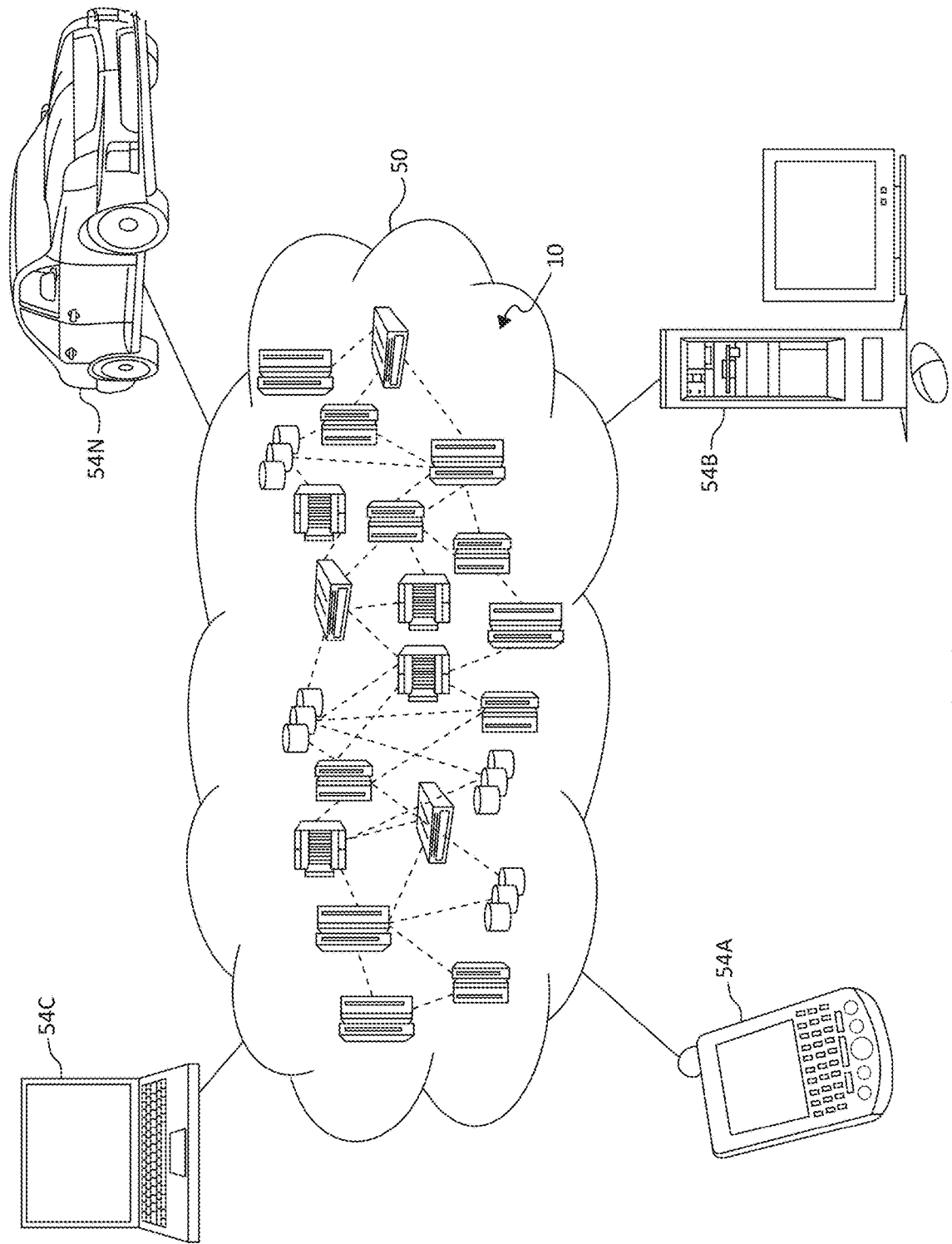
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
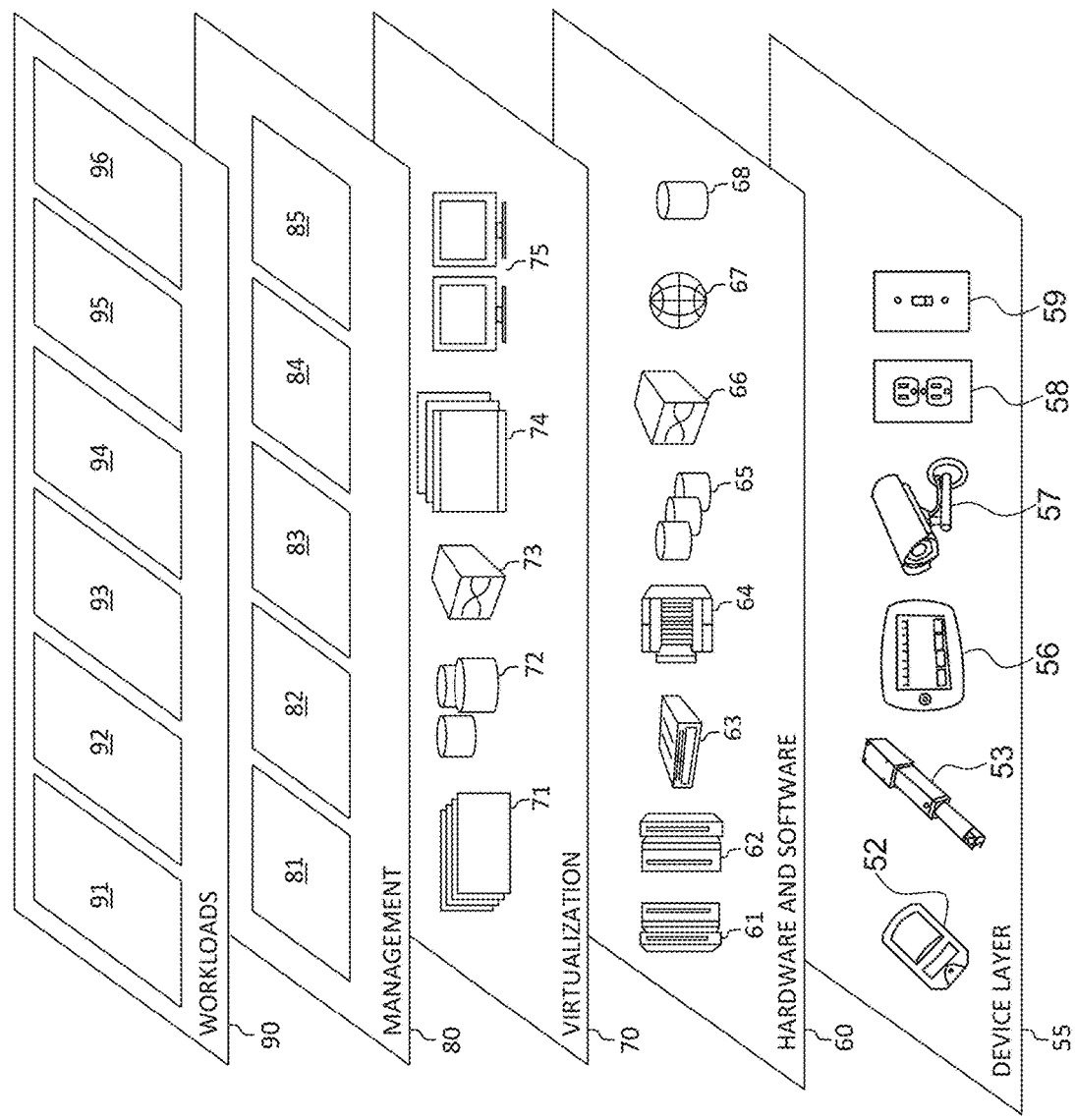
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto.

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for representing the operational state of a distributed computing system as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and systems are provided for representing (or generating a representation of, mapping, etc.) the operational state of a distributed computing system (or distributed system), or more particularly, the components and the relationships between the components within such systems, based on, for example, personalized, adaptive heuristics (e.g., of the user) and/or an iterative learning mechanism. In some embodiments, the relationships are ranked based on information associated with the user and dynamically and/or selectively provided (or rendered) to the user based on such information in order to, for example, aid in correcting problems within the system (e.g., by prioritizing components and/or relationships that should be investigated).

In some embodiments, the system generates an initial or healthy state representation of the distributed system, which includes (or indicates) of the nodes (or components) within the system as well as relationships between the nodes. The relationships may be considered to exist between any nodes (e.g., two of the nodes) that send communications to one another and/or are in operable communication with each other. That is, a relationship within the distributed system may be determined or detected when any of the nodes communicates and/or is in operable communication with another one of the nodes. The system may detect the nodes and the relationships in various ways, such as querying node attributes, detecting (and analyzing) network traffic, analyzing creation timestamps, etc. In some embodiments, the representation includes one or more symbols, each of which is representative (or indicative) of a node within the distributed system, and one or more relationship indicators, each of which is representative of a relationship between two nodes (or deployments), as described in greater detail below. In some embodiments, the representation of the distributed system is a knowledge graph of an ontology graph, as are commonly understood. The healthy state representation of the distributed system may or may not be provided to the user (e.g., rendered on a display of a computing device via a user interface).

In some embodiments, in the initial (or healthy state) representation, all of the detected relationships are "ranked" the same. As such, all of the relationships may be generated and/or rendered in the same manner (i.e., all of the relationships are similar or identical).

When a problem within the distributed system, or more particularly, within one or more of the nodes (e.g., a node has failed), is detected, the nodes that are related to the problematic node are identified (e.g., using the healthy state representation). It should be noted that in some embodiments, nodes may have relationships with multiple other nodes. For example, if node A fails, and node A is detected as having relationships with node B and node C, nodes B and C, along with the respective relationships to node A, may be determined to the items that may be the cause of the problem with node A. Such may be used to determine an impaired or unhealthy state of the distributed system, or more particularly, to determine which nodes and/or relationships in the distributed system are at least potentially the cause(s) of the problem.

Before generating the "customized" representation of the distributed system described below, a "standard" or "non-customized" impaired state representation that indicates the potential causes of the problem may be generated. For example, continuing with the example described above, a standard impaired state representation may be generated that shows no relationships (or edges) between node A and node B and between node A and node C and/or those edges may be rendered in a manner that is different than the edges between the properly functioning nodes (e.g., using thicker lines, different colors, etc.). In other words, the lack of edges (or altered edges) between the nodes may be indicative of the lack of proper functionality of and/or communication between the nodes. As such, the difference(s) between the healthy state and the impaired state of the distributed system may be determined by, for example, comparing the edges/relationships of the healthy state and impaired state. Thus, the standard impaired state representation may indicate which nodes/relationships may be the cause of the problem. The standard impaired state representation of the distributed system may or may not be provided to the user.

However, in situations in which the distributed system has a high number of nodes, such a manner of differentiating healthy nodes/relationships from impaired nodes/relationships may require a human responder to spend a considerable amount of time investigating potential causes of the problem (i.e., dozens, hundreds, etc. of related nodes).

As such, in some embodiments, the methods and systems described herein generate an enhanced and/or customized impaired state representation of the distributed system, which indicates or suggests which of the impaired nodes/relationships should be prioritized. As described above, information associated with the user may be utilized. Additionally, timestamp correlation may be used. That is, in some embodiments, the system may record the timestamps associated with node failures and correlate them. For example, if both node A and node B become impaired at the same time (or with little delay therebetween), the relationship between node A and node B may be "ranked" higher than relationships between other pairs of impaired nodes. This ranking may be utilized to render the relationship between node A and node B in a different manner than the relationships between other pairs of impaired nodes. That is, because node A and node B failed at about the same time, the causes of those failures may be related and investigating those nodes/relationships should be prioritized.

As described above, information associated with the user may also be used to generate the enhanced and/or customized impaired state representation. For example, subjects associated with the user and a details related to the history of the user (and/or other users) may be utilized. With respect to subjects associated with the user, as one example, if the user's profile indicates that they have expertise in and/or experience with a particular field (e.g., cognitive analysis), and particular ones of the impaired nodes/relationships are determined to be related to that particular field and/or perform a functionality associated with that field, those nodes/relationships may be ranked relatively high and rendered in such a way to differentiate them from the other impaired nodes/relationships. With respect to user history, as one example, if the profile (and/or stored utilization history) indicates that the user has previously investigated similar failures and/or the manner in which those failures were resolved, such may be utilized to rank some of the failed nodes/relationships higher than others. It should be noted that in some embodiments information associated with other users (e.g., profile information, utilization history, etc.) may be utilized, such that the system may utilize "crowdsourcing," as is commonly understood.

In some embodiments, a random forest classifier (or another ensemble learning method) is utilized to generate representations (i.e., healthy or impaired state) and/or alter (or morph) representations after being provided to the user. For example, such may be utilized to determine the relationship based on state-time parameters and health sequence (i.e. healthy state vs. impaired state may be determined based on node interactions and the representation may be generated and/or morphed based on user information and/or reactions).

For example, consider a particular relationship (relationship R1→{Node A, Node B}) in a rendered representation, with a first health status at a first time (H1 @ T1) with an initial edge (or relationship indicator) shown. In some embodiments, a convolutional neural network (CNN) is utilized to determine a satisfaction rating for the user based on the user's reactions and/or contextual situation with respect to the initial rendering. As such, when the representation is provided to the user, the user may be monitored in various ways. For example, in some embodiments, a camera (e.g., associated with a computing device of the user and/or deployed in an appropriate location) is used to detect facial microexpressions (and/or the modulation thereof) of the user, which may be utilized to determine (or calculate) a (first) satisfaction rating (S1). In other embodiments, other types of sensors, such as a heart rate and/or blood pressure sensor, may be utilized. Additionally, the user's interaction (or lack thereof) with the representation may be taken into consideration. For example, if the user is detected as not interacting with the representation (e.g., little or no user device activity), after staring at it for several minutes, such may be indicative of a low satisfaction rating (e.g., the user is having trouble understanding the representation and/or the cause of the problem within the distributed system).

Continuing with the example above, if the relationship changes (relationship R1→{Node A, Node B}), as indicated by a second health status at a second time (H2 @ T2, wherein T2=T1+ΔT), if the health falls below a particular threshold (e.g., H2 ≪H1), the edge between the nodes may be rendered in a different manner (e.g., broken, highlighted, etc). That is, R2 may be ranked higher than R1, and thus rendered in a more "noticeable" manner. A second satisfaction rating (S2) for the user may be determined (e.g., in a manner similar to that described above). If the second satisfaction rating is higher than the first satisfaction rating, the manner in which the relationship (and/or representation as a whole) is rendered may not be further changed. However, if the second satisfaction rating is lower than the first satisfaction rating, the manner in which the relationship (and/or representation as a whole) is rendered may be changed (e.g., to further "highlight" the relationship/nodes). The system may continue to update the ranking of relationships (and/or nodes) in this manner, facilitating the investigation of the detected problems within the distributed system.

Figure 4:
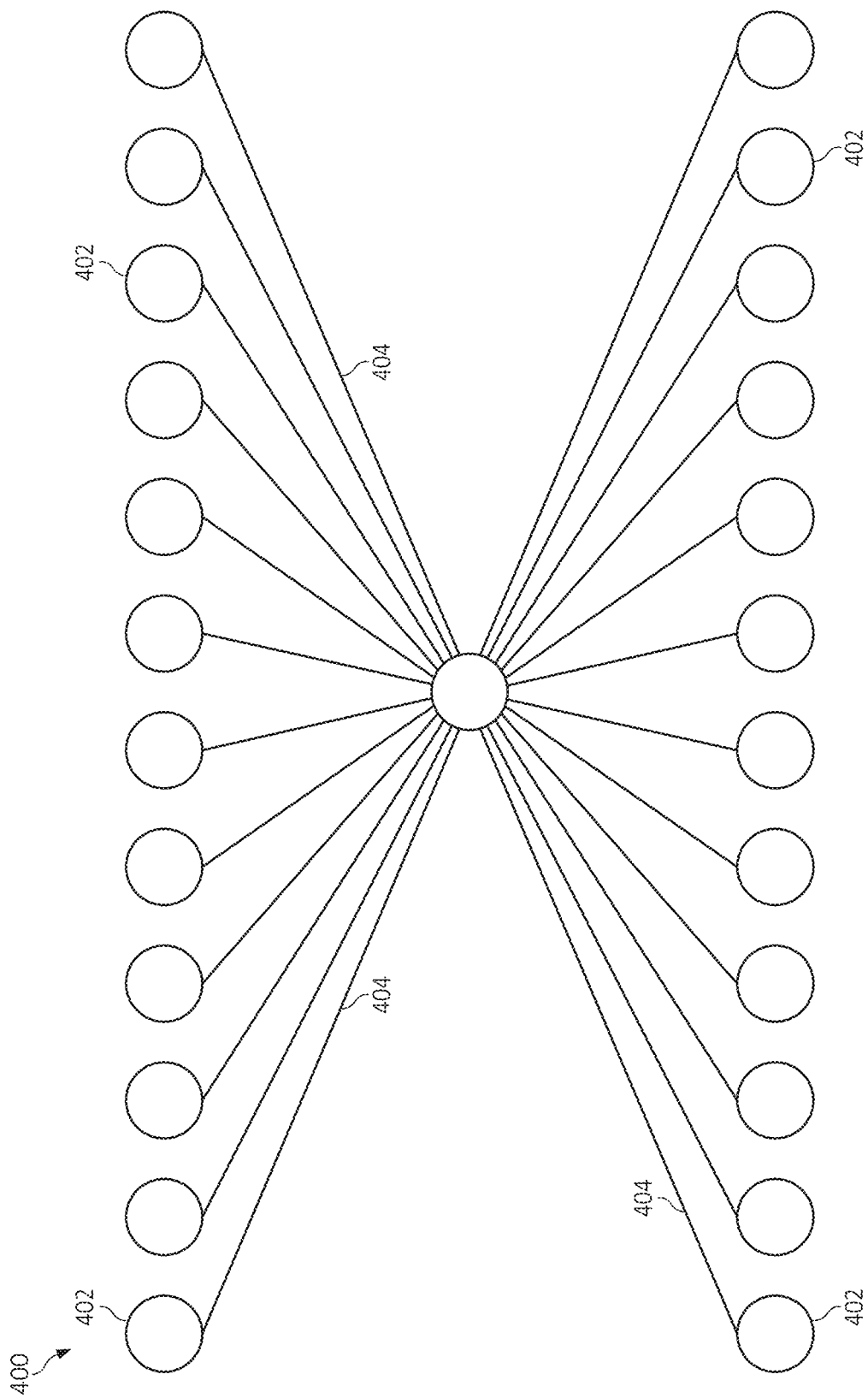
FIG. 4 is a diagram of a representation of a healthy state of a distributed computing system according to an embodiment of the present invention.

FIG. 4 illustrates an exemplary healthy state (or initial) representation 400 of a distributed system (or a representation or diagram of a healthy state of a distributed system), according to some embodiments. The representation 400 may be considered to be in the form of an ontology graph or a knowledge graph, as are commonly understood in the art. The representation 400 includes node symbols (or nodes) 402 and relationship indicators (or edges) 404. Each of the node symbols 402 is representative of a node (or component) within the respective distributed system, and each of the relationship indicators 404 is representative of a relationship (e.g., communication) between two of the nodes 402. As such, each of the relationship indicators 404 interconnects two of the nodes 402. Although the example shown includes circular symbols to represent the nodes and straight lines to represent the relationships, it should be understood that this is intended merely as an example, as different shapes/types of symbols and relationship indicators may be used. The representation 400 as shown in FIG. 4 may be generated in the manner described above and may or may not be provided to the user (e.g., rendered on a display device).

Figure 5:
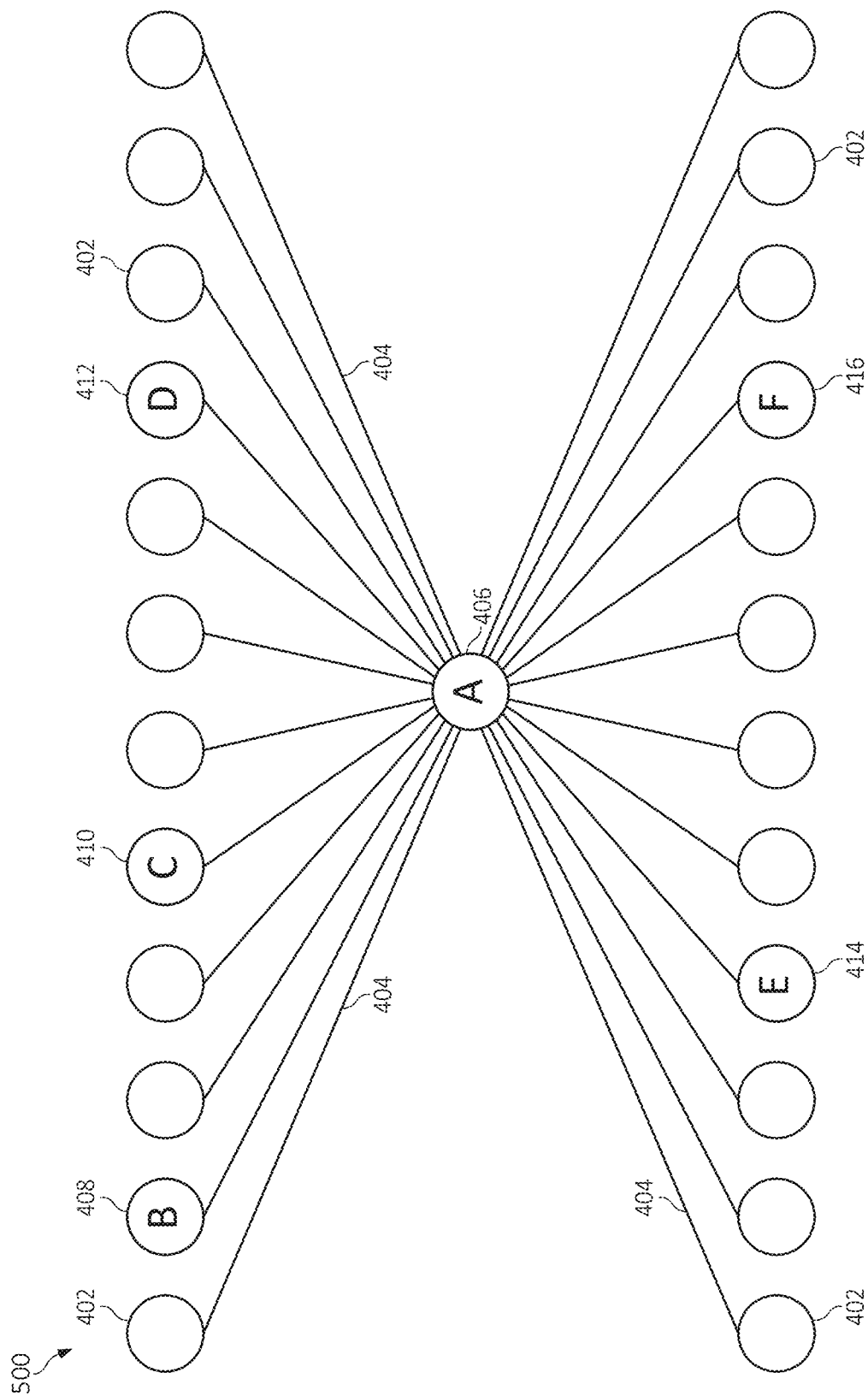
FIG. 5 is a diagram of a representation of an impaired state of the distributed computing system of FIG. 4.

FIG. 5 illustrates an exemplary impaired (or unhealthy) state representation 500 of the distributed system of FIG. 4. As such, the representation shown in FIG. 5 includes the nodes 402 and relationship indicators 404 of FIG. 4. In the example shown, a problem has occurred with node 406 (or Node A), and communication between node 406 and node 408 (or Node B), node 410 (or Node C), node 412 (or Node D), node 414 (or Node E), and node 416 (or Node F) has ceased, is not occurring properly, etc. As such, the relationship indicators (or edges 404) between Node A and Nodes B, C, D, E, and F are no longer shown (and/or have been "broken"). As another example (not shown), in order to indicate which of the relationships have been disrupted, instead of removing/deleting the appropriate relationship indicators 404, those relationship indicators 404 may be rendered in a different manner than the relationship indicators associated with healthy nodes/relationships (e.g., the impaired relationships may be represented by relationship indicators that are thicker, a different color, etc. compared to the other relationship indicators). The representation 500 as shown in FIG. 5 may be generated in the manner described above and may or may not be provided to the user (e.g., rendered on a display device).

Figure 6:
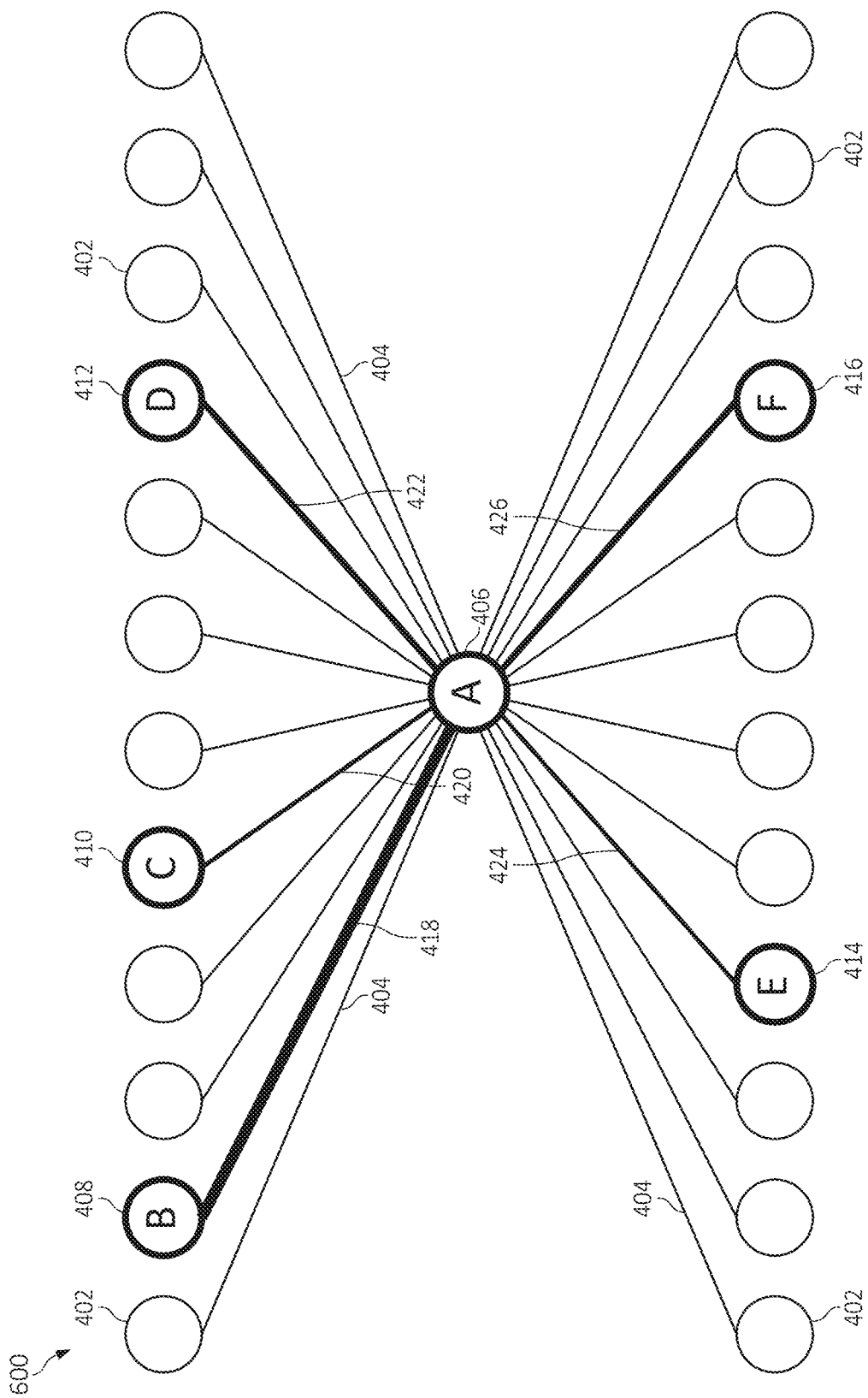
FIG. 6 is a diagram of an enhanced representation of the distributed computing system of FIGS. 4 and 5 according to an embodiment of the present invention.

FIG. 6 illustrates an exemplary enhanced and/or customized representation 600 of the distributed system of FIGS. 4 and 5, according to some embodiments described herein. As such, the representation 600 shown in FIG. 6 includes the nodes 402 and relationship indicators 404 of FIGS. 4 and 5, along with Nodes A-F being indicated. Of particular interest in FIG. 6 is that (impaired) relationship indicators are shown between Node A and Nodes B-F, specifically as relationship indicators 418-426. However, as shown, relationship indicators 418-426 are rendered or displayed in a manner different than the other (or healthy) relationship indicators 404. In the example shown, relationship indicators 418-426 are made of (or include) lines that are thicker or heavier than those of the other relationship indicators 404. As such, the representation 600 shown in FIG. 6 may be considered to include a first set of relationship indicators (i.e., associated with healthy or unimpaired relationships), specifically relationship indicators 404, and a second set of relationship indicators (i.e., associated with unhealthy or impaired relationships), specifically relationship indicators 418-426. In the example shown, in order to further assist the user in identifying components associated with the detected problem with the distributed system, nodes 408-416 (or Nodes A-F) are rendered in a manner different than the other nodes 402 (e.g., utilizing thicker, heavier lines).

Still referring to FIG. 6, it should also be noted that relationship indicators 418-426 are not identical to one another. Specifically, relationship indicators 418-426 are displayed with varying thicknesses of lines, with relationship indicator 418 having the thickest or heaviest line. Such may be the result of the ranking process described above. That is, based on, for example, information associated with the user, timestamp correlation, etc., the relationship represented by relationship indicator 418 (and/or Nodes A and B) has been determined to be of a higher priority and/or more important to resolving the problem experienced by the distributed system (e.g., at least with respect to the user and/or the user's expertise). In the example shown, relationship indicators 422 and 426 are displayed with thicker lines than relationship indicators 420 and 424, indicating further weighting or ranking with respect to the relationships, as described above.

Figure 7:
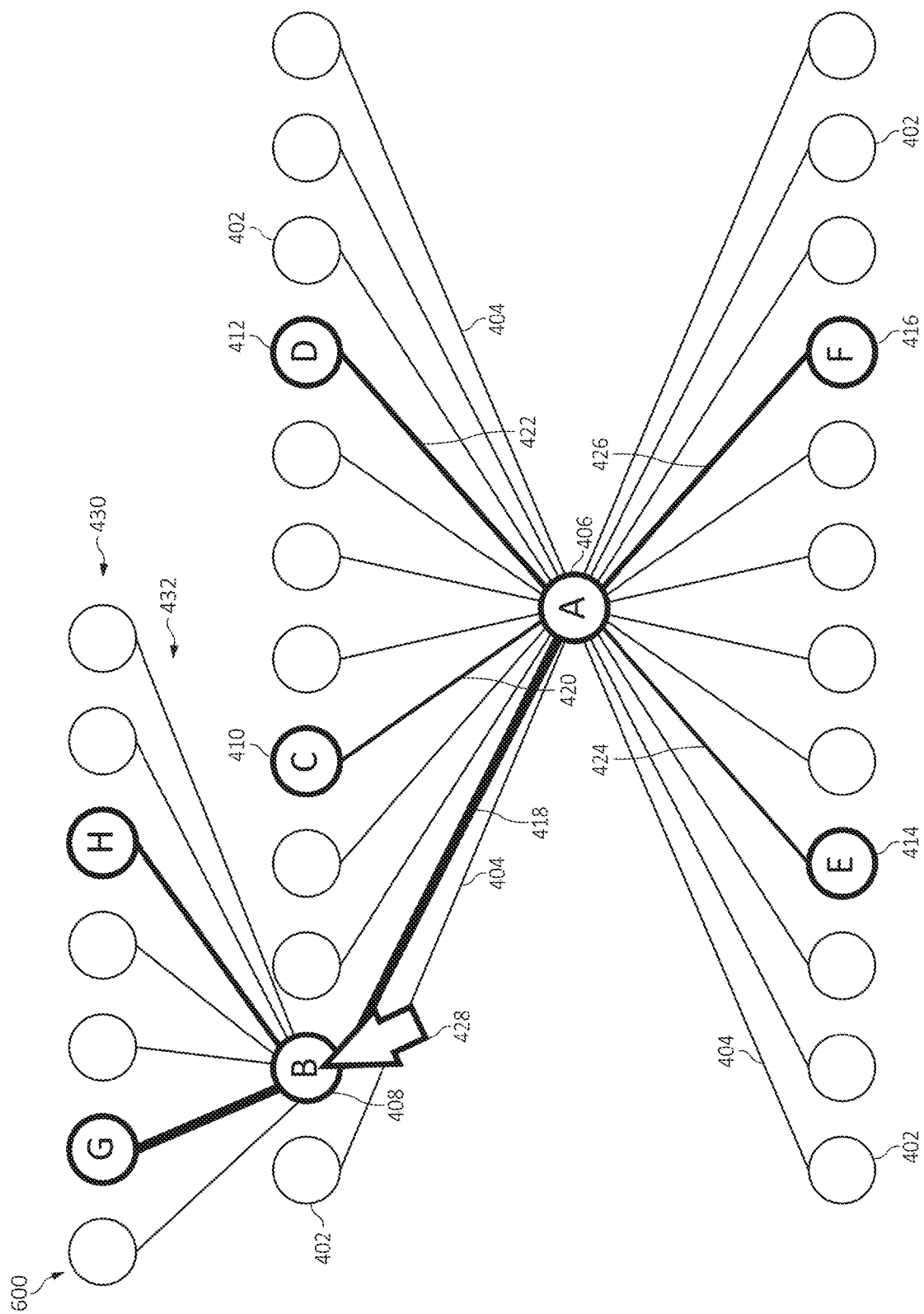
FIG. 7 is a diagram of the enhanced representation of FIG. 6 with additional nodes and relationships shown according to an embodiment of the present invention.

FIG. 7 illustrates the enhanced representation 600 of FIG. 6 after the user has interacted therewith. In particular, the user may select one of the nodes utilizing, for example, a cursor 428 (e.g., via a suitable user input device, such as a mouse or keyboard). In response, the system may add to the representation 600 by rendering additional nodes that are related to the selected node (if any). In the example shown, the user has selected Node B (or node 408). In response, an additional "level" of the representation 600 has been generated, which includes additional nodes 430 (i.e., related to Node B) and relationship indicators 432, which may be enhanced and/or customized in a manner similar to the other portions of the representation, as described above. As such, in the example shown, the relationship indicators between Node B and Nodes G and H have been ranked, weighted, and/or emphasized in a manner similar to relationship indicators 418-426.

Figure 8:
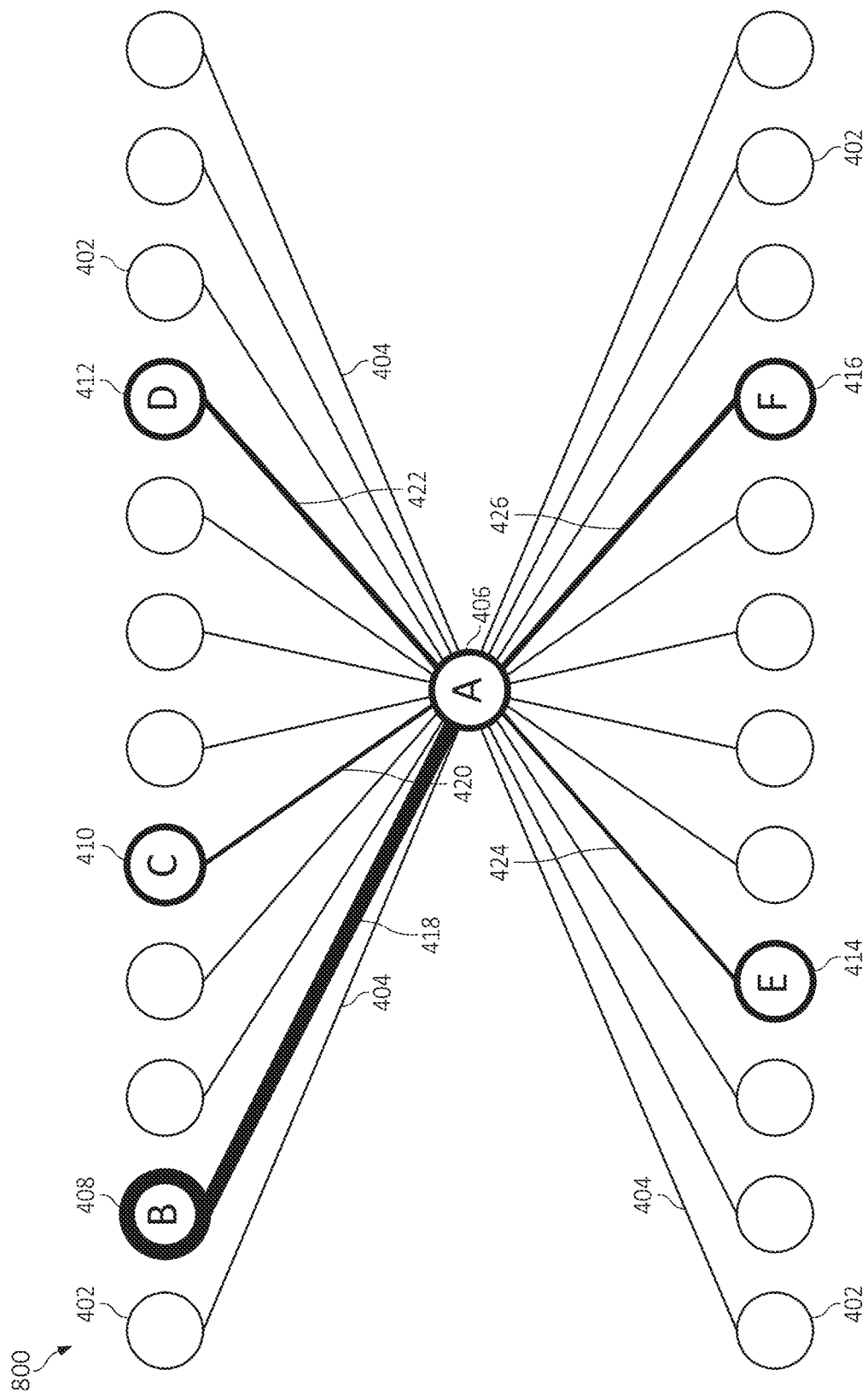
FIG. 8 is a diagram of the enhanced representation of FIG. 6 after being altered according to an embodiment of the present invention.

As described above, the representations of distributed systems described herein may be altered or morphed based on user feedback and/or reactions. For example, consider a scenario in which the representation 600 of FIG. 6 is provided to a user, and the system determines that their satisfaction rating is below a predetermined threshold (e.g., based on facial expressions, lack of interaction with the system, etc.). FIG. 8 illustrates an altered version 800 of the representation 600 of FIG. 6. As is evident when comparing FIG. 8 to FIG. 6, the thicknesses of the various lines have been adjust to further emphasize the importance of the relationship represented by relationship indicator 418 and Node B (e.g., in the event that the user has trouble determining such from viewing/consuming the representation 600 in FIG. 6, which may particularly be an issue when the representation includes a high number of nodes/relationships).

Figure 9:
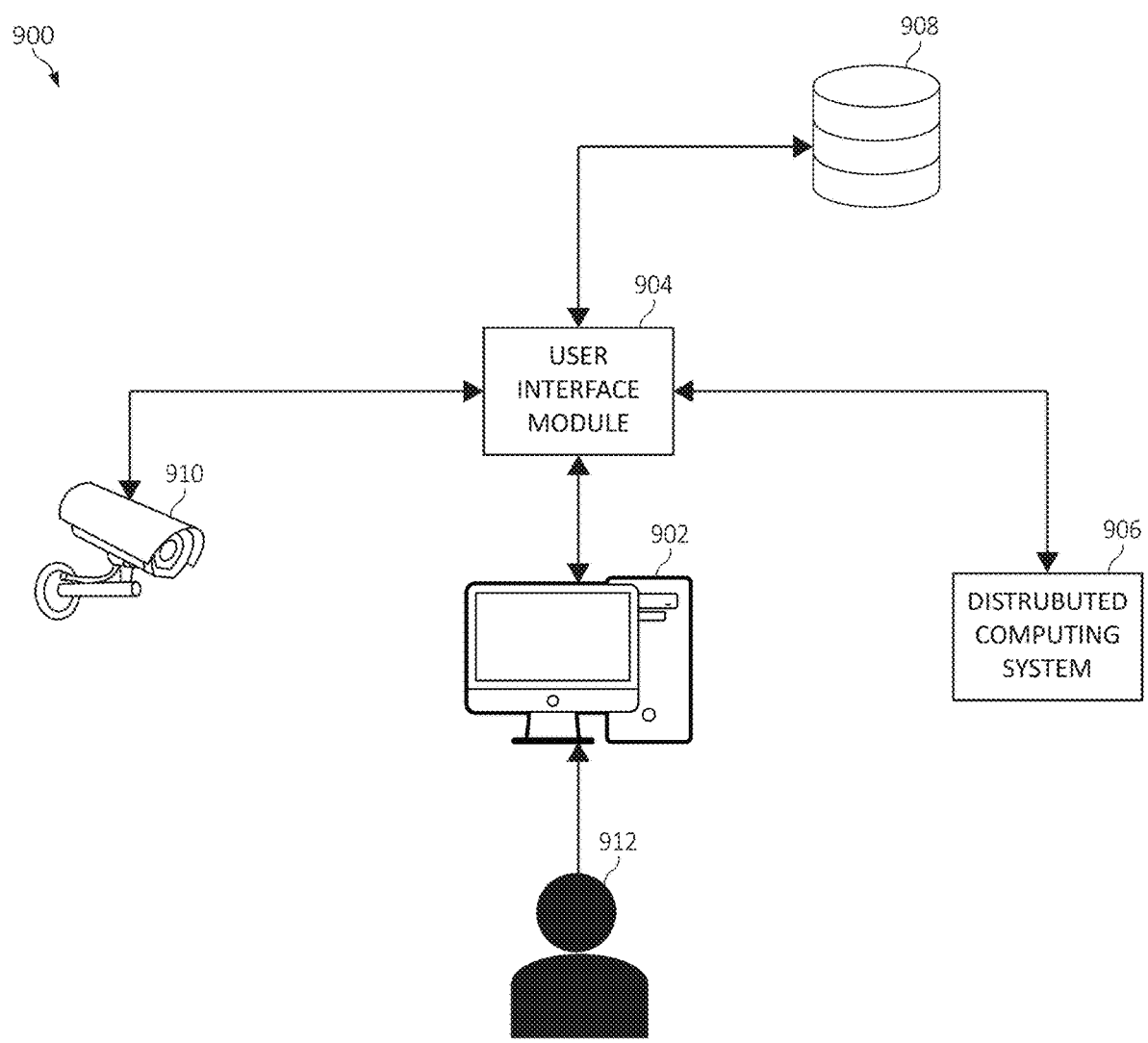
FIG. 9 is a plan view of a exemplary computing environment according to an embodiment of the present invention.

FIG. 9 illustrates a computing environment 900 in which the embodiments described herein may be implemented. In the depicted environment, the computing environment 900 includes a computing device 902, a user interface module 904, a distributed computing system 906, a database 908, and a sensor 910.

The computing device (or node) 902 may be any suitable computing device, such as those described above (e.g., a desktop PC, a mobile electronic device, etc.), which may be utilized by a user or individual 912 to, for example, utilize the user interface module 904 (e.g., to generate and interact with representations of the distributed computing system 906). Although not shown in detail, the computing device 902 may include a display screen and one or more user input devices (e.g., a keyboard, a mouse, a touchscreen, a microphone, etc.).

The user interface module 904 may be implemented with any suitable computing device (e.g., a software application installed on the computing device 902) and may be configured to perform the functionality described herein. Although not shown in detail, the user interface module 904 may include a cognitive module and/or be configured to perform the cognitive analysis (or analyses), machine learning techniques, etc. described above.

The distributed computing system 906 may include multiple components (e.g., microservices, containers, etc.) that are implemented on different networked computing devices (perhaps including computing device 902) that coordinate their actions by sending various types of communications (e.g., requests, data, etc.) to one another, as described above.

The database 908 may include any suitable memory device(s) on which various types of information or data is stored. For example, various types of information about the user 912 (and/or other users) may be stored on the database 908, such as profile information about the user, previous interactions with/utilization of the user interface module 904, etc.

The sensor 910 may include any type of sensor which may be utilized to monitor the user 912. As one example, the sensor 910 may include a camera. However, other types of sensors may be utilized, such as heart rate and/or blood pressure monitors.

In some embodiments, at least some of the components shown in FIG. 9 are integrated into a common computing node. For example, the user interface module 904, the database 908, and/or the sensor 910 may be integral with the computing device 902. However, in some embodiments, the components shown in FIG. 9 may be remote from each other and in operable communication via any suitable communication network (e.g., the Internet).

Figure 10:
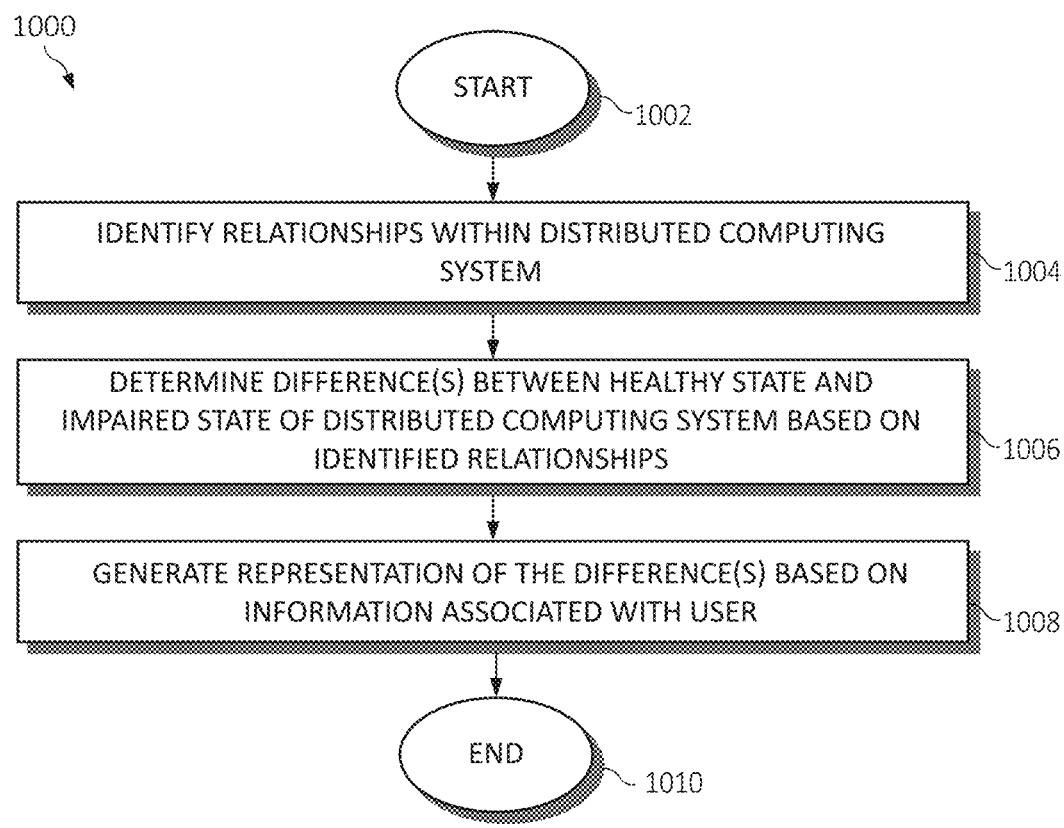
FIG. 10 is a flowchart diagram of an exemplary method for representing the operational state of a distributed computing system according to an embodiment of the present invention.

Turning to FIG. 10, a flowchart diagram of an exemplary method 1000 for representing the operational state of a distributed computing system, in accordance with various aspects of the present invention, is provided. Method 1000 begins (step 1002) with, for example, a distributed computing system being implemented utilizing a plurality of computing components or nodes (e.g., via a communications network, the Internet, etc.), such as Kubernetes nodes, docker nodes, and virtual machines.

Relationships within the distributed computing system are identified (step 1004). Each of the identified relationships is associated with communication between two of the plurality of computing nodes within the distributed computing system. The relationships may be identified by, for example, examining object attributes, such as owner and namespace (i.e., explicit relationships) or determined based on network traffic, creation timestamp, events, pod states, etc. (i.e., implicit relationships).

At least one difference between a healthy state of the distributed computing system and an impaired state of the distributed computing system is determined based on the identifying of the relationships (step 1006). For example, a comparison of the (active/healthy) relationships in the healthy state of the distributed computing system to the relationships (or lack thereof) in the impaired state of the distributed system may be made, the results of which may be indicative of the differences between the healthy state and the impaired state.

A representation of the determined at least one difference between the healthy state and the impaired state of the distributed computing system is generated based on information associated with a user (step 1008). The information associated with the user may include at least one of a history of the user and subjects associated with the user. The representation of the determined differences between the healthy state and the impaired state of the distributed computing system may include a plurality of symbols and a plurality of relationship indicators. Each of the plurality of symbols may be associated with a respective one of the plurality of computing nodes, and each of the plurality relationship indicators may be associated with a respective one of the identified relationships. The plurality of relationship indicators may includes first relationship indicators and second relationship indicators. The second relationship indicators may be different than the first relationship indicators and associated with the impaired state of the distributed computing system. At least some of second relationship indicators may be different than others of the second relationship indicators based on the information associated with the user. The representation of the determined at least one difference between the healthy state and the impaired state of the distributed computing system may be provided to the user.

Method 1000 ends (step 1010) with, for example, the representation being rendered by a computing device associated with the user (e.g., being displayed to the user on a display screen). While the user views (or consumes) the representation, the user may be monitored (e.g., utilizing a sensor, such as a camera). Information associated with the monitoring the user may be received by the system. The representation may be altered based on the information. Additionally, in some embodiments, the user(s) may provide (explicit) feedback related to the generation of the representation(s), which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for representing the operational state of a distributed computing system, by a processor, comprising:
   identifying relationships within a distributed computing system, wherein each of the identified relationships is associated with communication between two of a plurality of computing nodes within the distributed computing system;
   determining at least one difference between a healthy state of the distributed computing system and an impaired state of the distributed computing system based on the identifying of the relationships; and
   generating a representation of the determined at least one difference between the healthy state and the impaired state of the distributed computing system based on information associated with a user, wherein the information associated with the user includes proficiency information from a user profile indicative that the user has expertise in a particular technological field corresponding to the impaired state of the distributed computing system, and wherein generating the representation is performed based on a determination that the proficiency information of the user comparatively relates to those of the plurality of computing nodes identified in the relationships which perform a functionality associated with the particular technological field.

2. The method of claim 1, wherein the representation of the determined differences between the healthy state and the impaired state of the distributed computing system includes a plurality of symbols and a plurality of relationship indicators, wherein each of the plurality of symbols is associated with a respective one of the plurality of computing nodes, and each of the plurality relationship indicators is associated with a respective one of the identified relationships, and wherein the plurality of relationship indicators includes first relationship indicators and second relationship indicators, wherein the second relationship indicators are different than the first relationship indicators and are associated with the impaired state of the distributed computing system.

3. The method of claim 2, wherein at least some of second relationship indicators are different than others of the second relationship indicators based on the information associated with the user.

4. The method of claim 1, further comprising:
   providing the representation of the determined at least one difference between the healthy state and the impaired state of the distributed computing system to the user;
   receiving information associated with monitoring the user while the representation is provided to the user; and
   altering the representation based on the information associated with the monitoring of the user.

5. The method of claim 4, wherein the monitoring of the user while the representation is provided to the user is performed utilizing a sensor.

6. The method of claim 1, wherein the plurality of computing nodes include at least one of Kubernetes nodes, docker nodes, and virtual machines.

7. A system for representing the operational state of a distributed computing system comprising:
   a processor executing instructions stored in a memory device, wherein the processor:
      identifies relationships within a distributed computing system, wherein each of the identified relationships is associated with communication between two of a plurality of computing nodes within the distributed computing system;
      determines at least one difference between a healthy state of the distributed computing system and an impaired state of the distributed computing system based on the identifying of the relationships; and
      generates a representation of the determined at least one difference between the healthy state and the impaired state of the distributed computing system based on information associated with a user, wherein the information associated with the user includes proficiency information from a user profile indicative that the user has expertise in a particular technological field corresponding to the impaired state of the distributed computing system, and wherein generating the representation is performed based on a determination that the proficiency information of the user comparatively relates to those of the plurality of computing nodes identified in the relationships which perform a functionality associated with the particular technological field.

8. The system of claim 7, wherein the representation of the determined differences between the healthy state and the impaired state of the distributed computing system includes a plurality of symbols and a plurality of relationship indicators, wherein each of the plurality of symbols is associated with a respective one of the plurality of computing nodes, and each of the plurality relationship indicators is associated with a respective one of the identified relationships, and wherein the plurality of relationship indicators includes first relationship indicators and second relationship indicators, wherein the second relationship indicators are different than the first relationship indicators and are associated with the impaired state of the distributed computing system.

9. The system of claim 8, wherein at least some of second relationship indicators are different than others of the second relationship indicators based on the information associated with the user.

10. The system of claim 7, wherein the processor further:
provides the representation of the determined at least one difference between the healthy state and the impaired state of the distributed computing system to the user;
receives information associated with monitoring the user while the representation is provided to the user; and
alters the representation based on the information associated with the monitoring of the user.

11. The system of claim 10, wherein the monitoring of the user while the representation is provided to the user is performed utilizing a sensor.

12. The system of claim 7, wherein the plurality of computing nodes include at least one of Kubernetes nodes, docker nodes, and virtual machines.

13. A computer program product for representing the operational state of a distributed computing system, by a processor, the computer program product embodied on a non-transitory computer-readable storage medium having computer-readable program code portions stored therein, the computer-readable program code portions comprising:
an executable portion that identifies relationships within a distributed computing system, wherein each of the identified relationships is associated with communication between two of a plurality of computing nodes within the distributed computing system;
an executable portion that determines at least one difference between a healthy state of the distributed computing system and an impaired state of the distributed computing system based on the identifying of the relationships; and
an executable portion that generates a representation of the determined at least one difference between the healthy state and the impaired state of the distributed computing system based on information associated with a user, wherein the information associated with the user includes proficiency information from a user profile indicative that the user has expertise in a particular technological field corresponding to the impaired state of the distributed computing system, and wherein generating the representation is performed based on a determination that the proficiency information of the user comparatively relates to those of the plurality of computing nodes identified in the relationships which perform a functionality associated with the particular technological field.

14. The computer program product of claim 13, wherein the representation of the determined differences between the healthy state and the impaired state of the distributed computing system includes a plurality of symbols and a plurality of relationship indicators, wherein each of the plurality of symbols is associated with a respective one of the plurality of computing nodes, and each of the plurality relationship indicators is associated with a respective one of the identified relationships, and wherein the plurality of relationship indicators includes first relationship indicators and second relationship indicators, wherein the second relationship indicators are different than the first relationship indicators and are associated with the impaired state of the distributed computing system.

15. The computer program product of claim 14, wherein at least some of second relationship indicators are different than others of the second relationship indicators based on the information associated with the user.

16. The computer program product of claim 13, wherein the computer-readable program code portions further include:
an executable portion that provides the representation of the determined at least one difference between the healthy state and the impaired state of the distributed computing system to the user;
an executable portion that receives information associated with monitoring the user while the representation is provided to the user; and
an executable portion that alters the representation based on the information associated with the monitoring of the user.

17. The computer program product of claim 16, wherein the monitoring of the user while the representation is provided to the user is performed utilizing a sensor.

18. The computer program product of claim 13, wherein the plurality of computing nodes include at least one of Kubernetes nodes, docker nodes, and virtual machines.

* * * * *